(12) United States Patent
Nagase

(10) Patent No.: US 11,877,099 B2
(45) Date of Patent: Jan. 16, 2024

(54) RECORDING SYSTEM, RECORDING METHOD, AND PROGRAM

(71) Applicant: JVCKENWOOD Corporation, Yokohama (JP)

(72) Inventor: Yoshinobu Nagase, Yokohama (JP)

(73) Assignee: JVCKENWOOD CORPORATION, Kanagawa (JP)

(*) Notice: Subject to any disclaimer, the term of this patent is extended or adjusted under 35 U.S.C. 154(b) by 0 days.

(21) Appl. No.: 17/728,733

(22) Filed: Apr. 25, 2022

(65) Prior Publication Data

US 2022/0256124 A1   Aug. 11, 2022

Related U.S. Application Data

(63) Continuation of application No. PCT/JP2020/028100, filed on Jul. 20, 2020.

(30) Foreign Application Priority Data

Oct. 31, 2019   (JP) .................................. 2019-198606

(51) Int. Cl.
*H04N 7/18*   (2006.01)
*G06V 20/56*   (2022.01)
*G06V 20/59*   (2022.01)
*H04N 5/77*   (2006.01)
*H04N 9/82*   (2006.01)
(Continued)

(52) U.S. Cl.
CPC ............. *H04N 7/188* (2013.01); *G06V 20/56* (2022.01); *G06V 20/593* (2022.01); *H04N 5/77* (2013.01)

(58) Field of Classification Search
None
See application file for complete search history.

(56) References Cited

U.S. PATENT DOCUMENTS

2014/0192194 A1* 7/2014 Bedell ....................... B60R 1/00
                                                                348/148
2014/0327773 A1* 11/2014 Scott-Cook ............ H04N 7/188
                                                                348/148
(Continued)

FOREIGN PATENT DOCUMENTS

EP           3544291 A1     9/2019
JP        2018187959 A     11/2018
(Continued)

*Primary Examiner* — Hung Q Dang
(74) *Attorney, Agent, or Firm* — Procopio, Cory, Hargreaves & Savitch LLP

(57) ABSTRACT

A recording system includes a shooting data acquisition unit, a passenger detection unit, a driver detection unit, a determination unit, and a recording control unit. The shooting data acquisition unit acquires shooting data from a camera for taking an image of inside/outside of a vehicle in which a driver and a passenger ride. The passenger detection unit detects at least the passenger. The driver detection unit detects the driver in a predetermined range. The determination unit determines whether the passenger inside the vehicle has gotten out thereof. The recording control unit instructs, after the driver detection unit no longer detects the driver detected until then, when the determination unit determines that the passenger has gotten out of the vehicle, a recording device to record the shooting data of the outside thereof.

1 Claim, 9 Drawing Sheets

(51) Int. Cl.
    *H04N 23/60*    (2023.01)
    *B60R 11/02*    (2006.01)

(56) References Cited

U.S. PATENT DOCUMENTS

| | | | |
|---|---|---|---|
| 2015/0073652 A1* | 3/2015 | Bennie | B60W 50/00 |
| | | | 701/36 |
| 2015/0077556 A1 | 3/2015 | Reed | |
| 2018/0050664 A1* | 2/2018 | Tarte | B60R 25/31 |
| 2018/0312114 A1 | 11/2018 | Inoue | |
| 2019/0222809 A1 | 7/2019 | Murata et al. | |
| 2020/0398637 A1* | 12/2020 | Chang | G08B 21/22 |
| 2020/0412944 A1 | 12/2020 | Okada | |
| 2021/0274136 A1 | 9/2021 | Murata et al. | |

FOREIGN PATENT DOCUMENTS

| | | |
|---|---|---|
| WO | 2013111745 A1 | 8/2013 |
| WO | 2018039646 A1 | 3/2018 |
| WO | 2019176391 A1 | 9/2019 |

* cited by examiner

RECORDING SYSTEM, RECORDING METHOD, AND PROGRAM

CROSS REFERENCE TO RELATED APPLICATION

The present application is based upon and claims the benefit of priority from Japanese Patent Application No. 2019-198606, filed on Oct. 31, 2019, the disclosure of which is incorporated herein in its entirety by reference.

BACKGROUND

The present invention relates to a recording system, a recording method, and a program.

There is a technology for shooting (i.e., photographing or filming) or imaging the inside of a vehicle when the occupants including the driver of the vehicle get out of the vehicle.

For example, International Patent Publication No. WO2013/111745 proposes an apparatus that determines whether or not any occupant remains inside a vehicle based on a result of a comparison between a reference image that is taken when it is determined that the driver is preparing to get out of the vehicle and a comparison image that is taken when it is determined that the vehicle is locked.

Japanese Unexamined Patent Application Publication No. 2018-187959 proposes an apparatus that activates a camera and a display, and displays an image taken by the camera on the display before an occupant(s) gets out of a vehicle.

SUMMARY

Although there are the above-described technologies, there may be a situation in which while a driver temporarily gets out of a vehicle, a passenger who has remained inside the vehicle gets out of the vehicle regardless of the driver's intention, so that the driver cannot find out the passenger's movements. There has been no technology for enabling a driver to find out passenger's movements in such a situation.

An embodiment according to the predetermined has been made to solve the above-described problem, and provides a recording system or the like capable of appropriately finding out the movements of a passenger who has gotten out of a stopped vehicle.

A recording system according to an embodiment includes a shooting data acquisition unit, a passenger detection unit, a driver detection unit, a determination unit, and a recording control unit. The shooting data acquisition unit is configured to acquire shooting data from a camera configured to take an image of an inside and an outside of a vehicle in which a driver and a passenger ride. The passenger detection unit is configured to detect at least the passenger. The driver detection unit is configured to detect the driver present in a predetermined range. The determination unit is configured to determine whether or not the passenger present inside the vehicle has gotten out of the vehicle. The recording control unit is configured to instruct, after the driver detection unit is no longer detecting the driver whom it had detected until then, and when the determination unit has determined that the passenger has gotten out of the vehicle, a recording device to record the shooting data of the outside of the vehicle.

A recording method according to an embodiment includes a shooting data acquisition step, a passenger detection step, a driver detection step, a determination step, and a recording control step. The shooting data acquisition step includes acquiring shooting data from a camera configured to take an image of an inside and an outside of a vehicle in which a driver and a passenger ride. The passenger detection step includes detecting at least the passenger from the shooting data. The driver detection step includes detecting the driver present in a predetermined range. The determination step includes determining whether or not the passenger present inside the vehicle has gotten out of the vehicle. The recording control step includes, after the driver who had been detected until then is no longer detected, when it is determined that the passenger has gotten out of the vehicle, instructing a recording device to record the shooting data of the outside of the vehicle.

A program according to an embodiment causes a computer to perform a method including a shooting data acquisition step, a passenger detection step, a driver detection step, a determination step, and a recording control step. The shooting data acquisition step includes acquiring shooting data from a camera configured to take an image of an inside and an outside of a vehicle in which a driver and a passenger ride. The passenger detection step includes detecting at least the passenger from the shooting data. The driver detection step includes detecting the driver present in a predetermined range. The determination step includes determining whether or not the passenger present inside the vehicle has gotten out of the vehicle. The recording control step includes, after the driver who had been detected until then is no longer detected, when it is determined that the passenger has gotten out of the vehicle, instructing a recording device to record shooting data obtained by shooting the passenger who has gotten out of the vehicle.

According to the embodiment, it is possible to provide a recording system or the like capable of appropriately finding out the movements of a passenger who has gotten out of a stopped vehicle.

DETAILED DESCRIPTION

The present disclosure will be described hereinafter through embodiments according to the invention. However, they are not intended to limit the scope of the invention according to the claims. Further, all the components/structures described in the embodiments are not necessarily indispensable as means for solving the problem. For clarifying the explanation, the following description and the drawings are partially omitted and simplified as appropriate. The same symbols are assigned to the same elements throughout the drawings and redundant descriptions are omitted as appropriate.

First Embodiment

Figure 1:
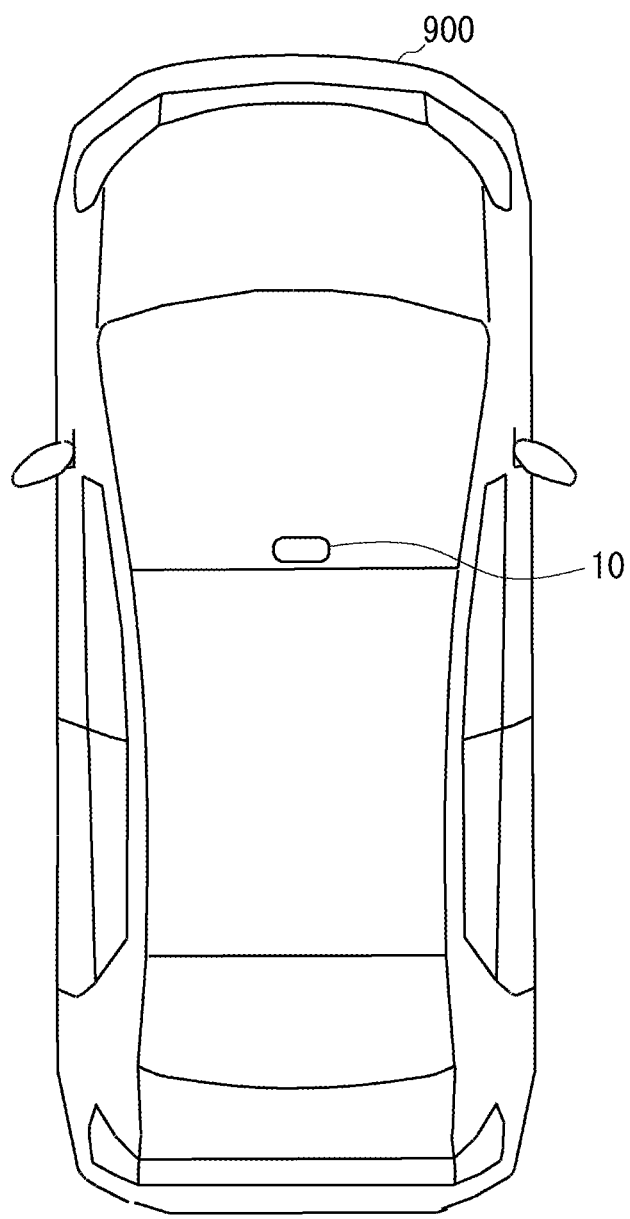
FIG. 1 is a top view of a vehicle provided with a recording system according to a first embodiment.

A configuration of an embodiment will be described hereinafter with reference to the drawings. FIG. 1 is a top view of a vehicle provided with a recording system. A recording system 10 is installed in a vehicle 900. The recording system 10 is fixed to an upper part of the windshield inside the cabin of the vehicle 900, which is a moving object.

The recording system 10 includes a camera, and has functions of a so-called dashboard camera that records and plays back shooting data taken by the camera. The camera included in the recording system 10 is an omnidirectional camera (i.e., a 360-degree camera). The omnidirectional camera takes a 360-degree image of scenery around the recording system 10. Therefore, the recording system 10 can shoot (i.e., photograph or film) the outside of the vehicle 900 (i.e., the outside of the cabin of the vehicle 900) and the inside of the vehicle 900.

As a function of a typical dashboard camera, when the recording system 10 receives a predetermined trigger, it records shooting data for a predetermined period as "event recording data" so that the data can be played back later. The situation in which the predetermined trigger is received is, for example, a situation in which a sudden impact having a predetermined magnitude is detected. The driver or the like of the vehicle can play back this event recording data and then view video images of the played-back event recording data, so that he/she can understand the situation regarding the event.

Figure 2:
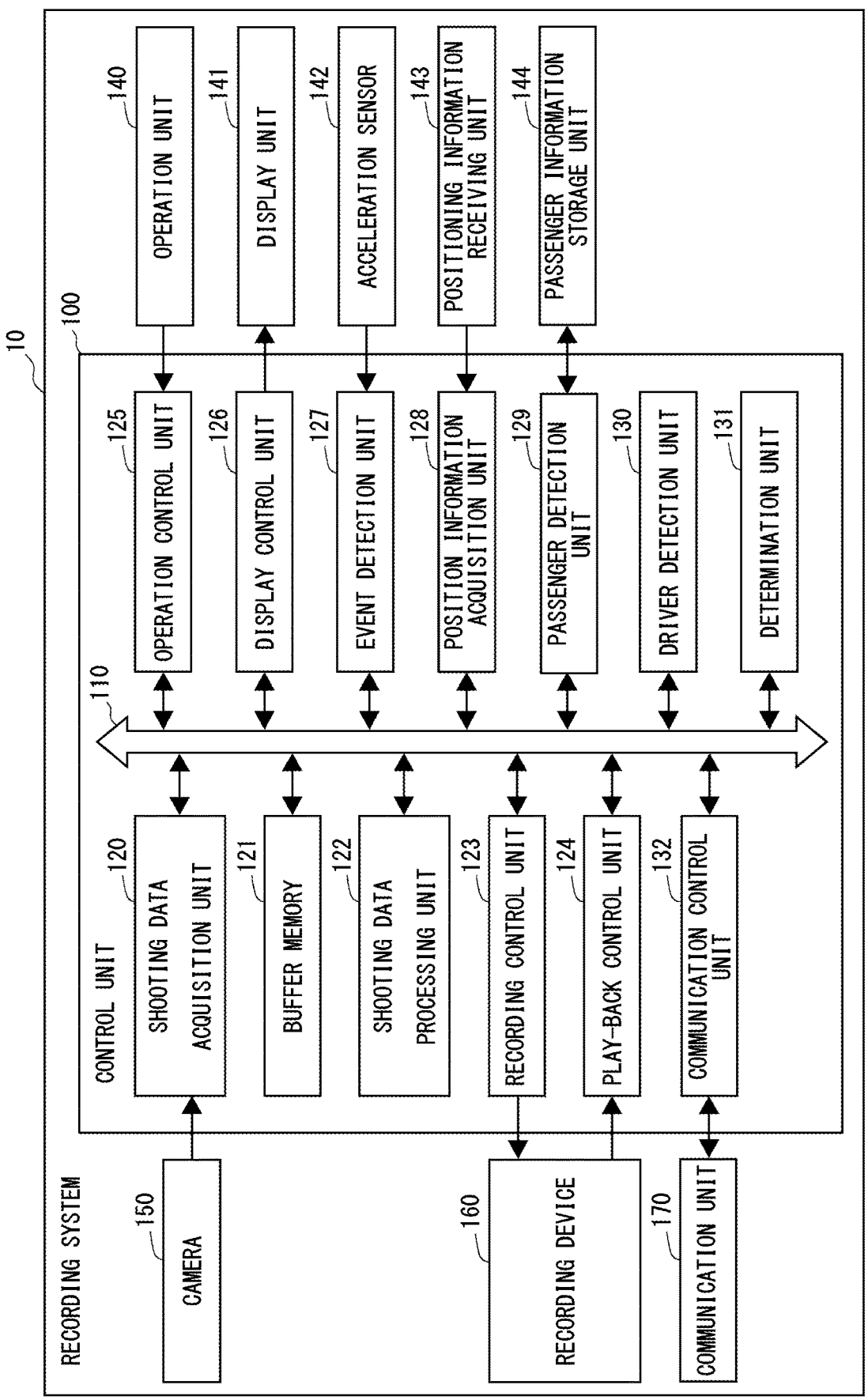
FIG. 2 is a block diagram of a recording system according to the first embodiment.

Next, a functional configuration of the recording system 10 will be described with reference to FIG. 2. FIG. 2 is a block diagram showing the configuration of the recording system 10. As shown in FIG. 2, the recording system 10 includes a control unit 100 that controls each of the components of the recording system 10, and a plurality of components connected to the control unit 100. The control unit 100 is a control apparatus including a circuit board on which a CPU (Central Processing Unit), a GPU (Graphics Processing Unit), a memory, a plurality of interfaces, and the like are mounted, and performs various processes by executing a stored program(s).

Details of the control unit 100 will be described hereinafter. The control unit 100 includes, as main components, a shooting data acquisition unit 120, a buffer memory 121, a shooting data processing unit 122, a recording control unit 123, a play-back control unit 124, an operation control unit 125, a display control unit 126, an event detection unit 127, a position information acquisition unit 128, a passenger detection unit 129, a driver detection unit 130, a determination unit 131, and a communication control unit 132. The processes performed by the recording system 10 are implemented by a program(s) executed by the control unit 100. For the sake of convenience, the aforementioned components are shown as if each of them is connected to a bus line 110.

The shooting data acquisition unit 120 acquires shooting data (i.e., photographing data or filming data) supplied from a camera 150. The camera 150 generates shooting data, for example, at a shooting rate of 30 frames per second (30 fps), and supplies the generated shooting data to the shooting data acquisition unit 120 once every sixtieth of a second. The shooting data acquisition unit 120 supplies the shooting data to the buffer memory 121 through the bus line 110.

The buffer memory 121 is a volatile or non-volatile memory device. The buffer memory 121 successively receives the shooting data generated by the camera 150 at regular intervals through the shooting data acquisition unit 120 and temporarily stores (i.e., temporarily retains) the received shooting data. The shooting data temporarily stored in the buffer memory 121 is shooting data for a predetermined period. The buffer memory 121 successively erases shooting data that has been stored (i.e., retained) therein beyond the predetermined period or successively overwrites it with newly received shooting data. That is, the buffer memory 121 functions as a ring buffer.

The shooting data processing unit 122 generates a shooting file in conformity with a predetermined method from the shooting data stored in the buffer memory 121. The predetermined method is, for example, H.264 or MPEG-4 (Moving Picture Experts Group phase 4). The shooting file generated by the shooting data processing unit 122 includes a header and a payload therein. The header of the shooting file includes information about, for example, the date and time at which the shooting file was generated, and the payload includes the shooting data.

The shooting data processing unit 122 may also perform a process for detecting a moving object inside the vehicle in cooperation with the passenger detection unit 129 or the driver detection unit 130. In this embodiment, the "moving object inside the vehicle" means a driver and a passenger inside the vehicle. Further, the passenger may include an animal such as a pet. That is, the shooting data processing unit 122 may perform a predetermined process for the shooting data as a process for detecting a moving object inside the vehicle, e.g., as pre-processing for enabling (or helping) the passenger detection unit 129 or the driver detection unit 130 to calculate feature values of the moving object inside the vehicle included in the shooting data. The predetermined process is, for example, calculation of HOG (Histograms of Oriented Gradients) feature values and/or image recognition processing in accordance with a certain method such as SVM (Support Vector Machine).

The recording control unit 123 performs control so that the shooting file generated by the shooting data processing unit 122 is recorded in a recording device 160. For example, when the event detection unit 127 detects an event, in response to the detection of the event, the recording control unit 123 makes the recording device 160 record a shooting file for a predetermined period as a write-protected event recording file. Note that the process through which the recording control unit 123 makes the recording device 160 record an event recording file is referred to as "event recording".

The recording control unit 123 makes the recording device 160 record the event recording file in a predetermined recording area therein. The predetermined recording area is, for example, a protected area that is defined as an area where overwriting or erasing is prohibited. Alternatively, the event recording file, which is supplied from the recording control unit 123 to the recording device 160, may be recorded with a flag that is included in the event recording file and indicate that the event recording file is write-protected or erase-protected.

The recording control unit 123 also performs "vehicle-vehicle-getting-out recording" in addition to the above-described event recording. The "vehicle-getting-out recording" means a process in which, after the driver detection unit 130 no longer detects the driver whom it had detected until then, when the passenger has gotten out of the vehicle, the getting-out of the passenger is detected by the passenger detection unit 129 (which will be described later), and shooting data of the outside of the vehicle, including shooting data obtained by shooting (i.e., photographing or filming) the passenger who has moved, is recorded in the recording device 160 as a vehicle-getting-out recording file.

The purpose of the vehicle-getting-out recording is to record, when the driver has left the vehicle 900 and the passenger has gotten out of the vehicle 900 while the driver is not aware thereof, the movements of the passenger who has gotten out of the vehicle 900. By performing the vehicle-getting-out recording, the recording system 10 can make the driver recognize (or enable the driver to recognize) the movements of the passenger who has gotten out of the vehicle.

More specifically, for example, when the driver who has stopped the vehicle 900 temporarily leaves the vehicle 900, the passenger may get out of the vehicle 900 and leave the vehicle 900 while the driver is not aware thereof. In such a case, the driver who has returned to the vehicle 900 does not know where the passenger has gone. In this case, the driver can find out in which direction the passenger, who gotten out of the vehicle, is headed by visually checking shooting data recorded through the vehicle-getting-out recording by using a portable terminal (which will be described later).

The play-back control unit 124 manages shooting files recorded in the recording device 160 and performs a process for playing back recorded shooting data. The play-back control unit 124, for example, reads a selected shooting file in response to an instruction from a user, and supplies the read shooting file to the display control unit 126 in order to play back the shooting file.

The operation control unit 125 acquires operation information received by an operation unit 140, and outputs an operation instruction to each of the components based on the operation information. For example, when the operation control unit 125 acquires an instruction to select a shooting file to be played back from the operation unit 140, it makes the play-back control unit 124 select the shooting file recorded in the recording device 160. When the operation control unit 125 acquires an instruction related to the play-back of various data from the operation unit 140, it makes the play-back control unit 124 perform a process related to the play-back thereof. The instruction related to the play-back of various data is, for example, an instruction for the start of play-back, a pause, the stop of play-back, displaying in a magnified manner, or the like.

The display control unit 126 controls a display unit 141 so as to display various information items. For example, the display control unit 126 makes the display unit 141 display thereof shooting data that is currently taken by the camera 150. Further, the display control unit 126 receives shooting data supplied from the play-back control unit 124, and makes the display unit 141 display thereon the received shooting data. In the case where the display unit 141 includes a touch sensor (i.e., a touch panel) which is disposed over the surface thereof and functions as the operation unit 140, the display control unit 126 makes the display unit 141 display thereon icons and the like corresponding to sensing points on the touch sensor as appropriate.

The event detection unit 127 receives information about an acceleration detected by an acceleration sensor 142, and detects that a predetermined event has occurred based on the received information about the acceleration, i.e., based on the magnitude and/or the signal pattern of the signal indicating the acceleration. The acceleration received from the outside is an acceleration that the recording system 10 receives from the vehicle 900, and for example, an acceleration caused by an impact that is generated when the vehicle 900 collides with another object.

When the event detection unit 127 detects that the signal received from the acceleration sensor 142 corresponds to the occurrence of the predetermined event, it supplies a signal indicating the detection of the occurrence of the event to the shooting data processing unit 122. The occurrence of an event is, for example, an impact generated by emergency braking or an impact that is generated when an object collides with the vehicle.

The position information acquisition unit 128 receives signals from positioning satellites received by a positioning information receiving unit 143, acquires position information, which is information about the current position of the vehicle, from the received signals, and supplies the acquired position information to the recording control unit 123. The position information includes, for example, the latitude and longitude of the vehicle at the time at which the signals were received from the positioning satellites.

The passenger detection unit 129 analyzes shooting data and thereby detects an occupant(s) present in (i.e., sitting on) the passenger seat or the rear seat of the vehicle. The occupant is a passenger present in the vehicle 900. The passenger may include not only persons but also animals. The passenger detection unit 129, in cooperation with the shooting data processing unit 122, extracts feature values of an object(s) present in the passenger seat or the rear seat in the vehicle included in the shooting data, and detects a person(s), an animal(s), and/or the like inside the vehicle based on the extracted feature values. The feature values can be any values or the like by which the object to be detected is characterized. Note that the feature values of a person are related to shooting data in which the positions of eyes, the shapes of hands, and the like are included, while the feature values of an animal are related to shooting data in which the positions of eyes, body hair, and the like are included.

The passenger detection unit 129 is connected to a passenger information storage unit 144, and makes the passenger information storage unit 144 store therein, as information about the detected passenger, the position of the seat on which the passenger sat when the passenger was riding in the vehicle 900. Further, the passenger detection unit 129 can read information about the passenger stored in the passenger information storage unit 144 and use the read information as required. In this way, for example, when the detected passenger is a passenger who was detected in the past, the passenger detection unit 129 can perform a process associated with past information. For example, the passenger detection unit 129, in cooperation with the determination unit 131, can identify, in association with information unique to the passenger who has been determined to have gotten out of the vehicle, the passenger who has gotten out of the vehicle.

Further, the passenger detection unit 129 may, instead of detecting an occupant present in (i.e., sitting on) the passenger seat or the rear seat in the vehicle by analyzing the shooting data, detect a passenger by using a sensor(s) provided in the vehicle 900. Examples of the sensor provided in the vehicle 900 include a pressure sensor, a strain sensor, or a temperature sensor provided in the passenger seat or the rear seat. Further, the sensor included in the passenger detection unit 129 may be a motion sensor capable of detecting whether or not the passenger is present in the passenger seat or the rear seat by using infrared light. The sensor included in the passenger detection unit 129 may be a receiver that detects a strength of a radio wave transmitted from a transmitter carried by the passenger.

The driver detection unit 130 recognizes the position of the driver's seat and the features of the appearance of the driver sitting on the driver's seat, and also detects the driver present in a predetermined range. The driver detection unit 130 stores in advance information as to which position corresponds to the driver's seat in shooting data taken by the camera 150. Then, the driver detection unit 130 determines that the person sitting on the driver's seat is the driver. The predetermined range is set in advance in the recording system 10, and is a range closer than a certain distance within which the recording system 10 can recognize the driver. For example, the predetermined range is a range within which the driver is detectable in the shooting data.

The predetermined range may be a range within which it is inferred that the driver, which is to be detected from shooting data, is present closer than a predetermined distance. For example, the predetermined range may be a range respective to a driver's sheet. To achieve the above-described function, for example, the driver detection unit 130 may estimate the position of the driver by storing (i.e., calculating) the size of the head from the image data of the driver when he/she is driving the vehicle and comparing the stored (i.e., calculated) size of the head with the size of the driver's head in the image data when he/she has left the driver's seat. The interior space of the vehicle may be set as the predetermined range.

Note that the driver detection unit 130 may detect the driver by using a sensor(s) provided in the vehicle 900, instead of detecting the driver from the shooting data. Examples of the sensor provided in the vehicle 900 include a pressure sensor, a strain sensor, or a temperature sensor provided in the driver's seat. Further, the sensor included in the driver detection unit 130 may be a motion sensor capable of detecting whether or not the driver is present in the driver's seat by using infrared light. The sensor included in the driver detection unit 130 may be a receiver that detects a strength of a radio wave transmitted from a transmitter carried by the driver.

The determination unit 131 determines whether or not the passenger present inside the vehicle has left the position of the passenger included in the shooting data and gotten out of the vehicle. The range of the shooting data inside the vehicle is set in advance. Therefore, the determination unit 131 can detect whether the passenger is present inside the vehicle or outside the vehicle. As means for setting the range inside the vehicle, the determination unit 131 may recognize the boundary between the inside of the vehicle and the outside thereof. In this way, the determination unit 131 can determine whether or not the passenger inside the vehicle has crossed the boundary and gotten out of the vehicle. In order to detect that the passenger has gotten out of the vehicle, a marker(s) may be provided at or near the boundary with the outside of the vehicle inside the vehicle in which a door is open. In this way, the determination unit 131 can determine that the passenger who has crossed the boundary has gotten out of the vehicle.

Further, the determination unit 131 may detect whether or not a door of the vehicle has changed from a closed door state to an opened door state, and may also determine whether or not the passenger has gotten out of the vehicle from the door which has been detected to be in the opened door state. In such a case, the determination unit 131 may be configured so as to be able to distinguish between the opened door state and the closed door state based on the shooting data. Alternatively, in such a case, the recording system 10 may be connected to an ECU (Electronic Control Unit) of the vehicle 900 so as to be able to communicate therewith, and may acquire information about the opening/closing of the door from the vehicle 900.

The communication control unit 132 controls communication with an external apparatus (external communication) performed through a communication unit 170. The external communication is communication that the recording system 10 performs with an entity or the like outside the recording system 10, such as a communication with a portable terminal carried by the driver who has left the vehicle 900.

When the communication control unit 132 determines that the passenger has gotten out of the vehicle, it transmits information about the getting-out of the passenger (vehicle-getting-out information) to the portable terminal carried by the driver through external communication. The information about the getting-out of the passenger includes, for example, at least one of the date and time at which the passenger gotten out of the vehicle, information unique to the passenger who has gotten out of the vehicle, and shooting data obtained at the time when the passenger got out of the vehicle. Note that the shooting data transmitted by the communication control unit 132 may be a still image or moving images having a predetermined length.

Next, each of the components/structures connected to the control unit 100 will be described. The recording system 10 includes the operation unit 140, the display unit 141, the acceleration sensor 142, the positioning information receiving unit 143, the passenger information storage unit 144, the camera 150, the recording device 160, and the communication unit 170.

The operation unit 140 is a user interface through which operations that the driver performs for the recording system 10 are received. The user interface may be, for example, operation buttons or a touch sensor (i.e., a touch panel) disposed over the surface of the display 141. Further, the user interface may instead be an infrared or radio communication receiving unit, and receives signals transmitted from a remote controller or the like. The operation unit 140 supplies operation information, which is information about a received operation, to the control unit 100 through a certain interface. The operation information is, for example, an instruction to start recording of an event, an instruction to play back event recording data, or the like.

The display unit 141 is a display device that displays various information items under the control of the display control unit 126. The display unit 141 includes, for example, at least a display panel such as a liquid crystal panel or an organic EL (Electro Luminescence) panel. The display unit 141 is connected to the display control unit 126 and displays images represented by signals supplied from the display control unit 126. The display unit 141 is configured so as to, for example, display a video image included in shooting data.

The acceleration sensor 142 is, for example, a three-axis acceleration sensor. The acceleration sensor 142 detects an acceleration exerted on the acceleration sensor 142 and outputs information about the detected acceleration according to the detected acceleration. The acceleration sensor 142 is connected to the event detection unit 127 and outputs information about the detected acceleration to the event detection unit 127. Note that the acceleration sensor 142 may be a one-axis or two-axis acceleration sensor instead of the three-axis acceleration sensor.

The positioning information receiving unit 143 receives information about the current position of the vehicle by using a satellite positioning system called GPS (Global Positioning System) or GNSS (Global Navigation Satellite System). The positioning information receiving unit 143 may be an antenna for receiving positioning signals or a communication interface for receiving position information that the vehicle acquires. The positioning information receiving unit 143 supplies the received signals related to the current position of the vehicle to the position information acquisition unit 128.

The passenger information storage unit 144 is a storage device including a memory composed of a volatile or non-volatile memory such as a DRAM (Dynamic Random Access Memory), a flash memory, an SSD (Solid State Drive), or a combination thereof. The passenger information storage unit 144 stores information about the passenger detected by the passenger detection unit 129 and can supply the stored information to the passenger detection unit 129.

The camera 150 is an imaging apparatus including an objective lens, an image pickup device, an A-D (Analog to Digital) conversion device, and the like. The camera 150 takes a video image including scenery around the vehicle, which is a moving object, and generates shooting data, i.e., data of the taken video image. The camera 150 supplies the generated shooting data to the shooting data acquisition unit 120.

The recording device 160 is a recording device in which the shooting data supplied from the camera 150 is stored. The recording device 160 is, for example, a memory card including a flash memory, or a non-volatile recording device such as an SSD or an HDD (Hard Disc Drive). The recording device 160 is connected to the recording control unit 123, and receives certain data from the recording control unit 123 and records the received data therein. Further, the recording device 160 supplies an event file including recorded event recording data to the play-back control unit 124 in response to an instruction from the play-back control unit 124. The recording device 160 may be configured (or constructed) so as to be detachable from the recording system 10, or so as to be not detachable therefrom.

The communication unit 170 is an interface that is connected with a portable terminal or the like carried by the driver so as to be able to communicate therewith, and is formed by, for example, an antenna and a circuit for modulating or demodulating signals to be transmitted through the antenna. The communication unit 170 may communicate directly with the above-described portable terminal, or communicate therewith through a base station, a relay apparatus, or the like. That is, the communication unit 170 is configured so as to be able to receive vehicle-getting-out information from the communication control unit 132 and transmit the received vehicle-getting-out information to the portable terminal.

Figure 3:
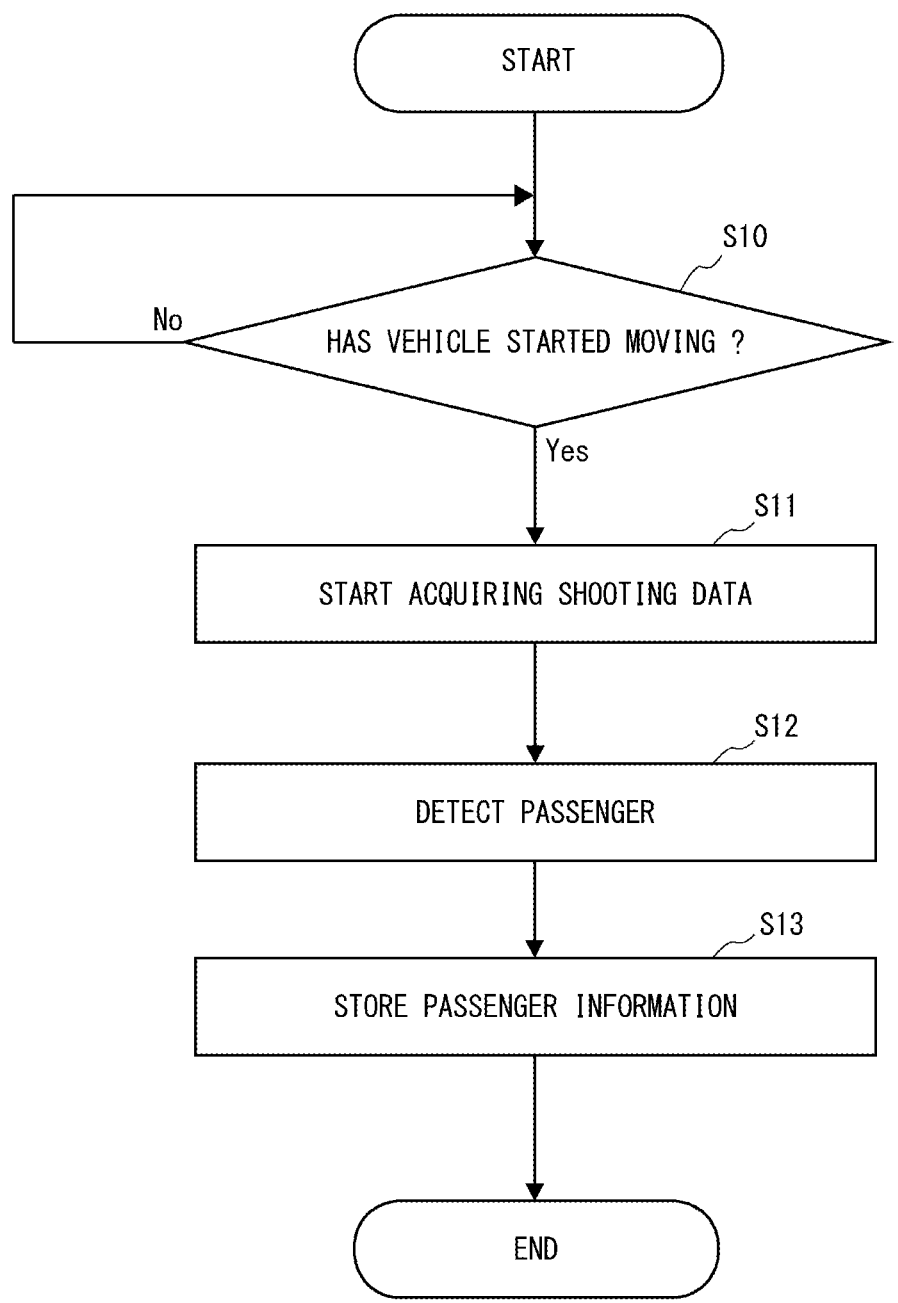
FIG. 3 is a flowchart showing a passenger recognition process performed by the recording system.

Next, a process through which the recording system 10 recognizes a passenger will be described with reference to FIG. 3. FIG. 3 is a flowchart showing a passenger recognition process performed by the recording system 10. The flowchart shown in FIG. 3 shows processes performed by respective components of the control unit 100 of the recording system 10. The process shown in FIG. 3 starts, for example, upon start-up of the recording system 10.

Firstly, the control unit 100 determines whether or not the vehicle 900 has started moving (Step S10). It is possible to detect whether or not the vehicle 900 has started moving based on position information acquired by the position information acquisition unit 128. When the vehicle 900 changes from a stopped state to a moving state, the control unit 100 determines that the vehicle 900 has started moving. When it is not determined that the vehicle 900 has started moving (Step S10: No), the control unit 100 repeats the step S10.

When it is determined that the vehicle 900 has started moving (Step S10: Yes), the shooting data acquisition unit 120 of the control unit 100 starts acquiring shooting data generated by the camera 150 (Step S11). When the shooting data acquisition unit 120 starts acquiring shooting data, the acquired shooting data is supplied to the buffer memory 121.

Next, the passenger detection unit 129 detects a passenger from the acquired shooting data (Step S12). Further, the passenger detection unit 129 makes the passenger information storage unit 144 store therein information about the detected passenger (Step S13).

Through the above-described processes, the recording system 10 stores the information about the passenger present (i.e., riding) in the vehicle 900 that has started moving. As a result, when the vehicle 900 stops, it is possible to detect whether the passenger has gotten out of the vehicle, and also to shoot (i.e., photograph or film) the passenger who has gotten out of the vehicle by the camera 150. Note that the above-described series of processes may be performed every time the vehicle 900 changes from a stopped state to a moving state. Alternatively, the opening/closing of a door of the vehicle 900 may be detected and the above-described processes may not be performed when the door remains in the closed door state. Note that the storing of the information about the passenger present in the vehicle may be performed by using the start-up of the engine of the vehicle 900 as a trigger.

Figure 4:
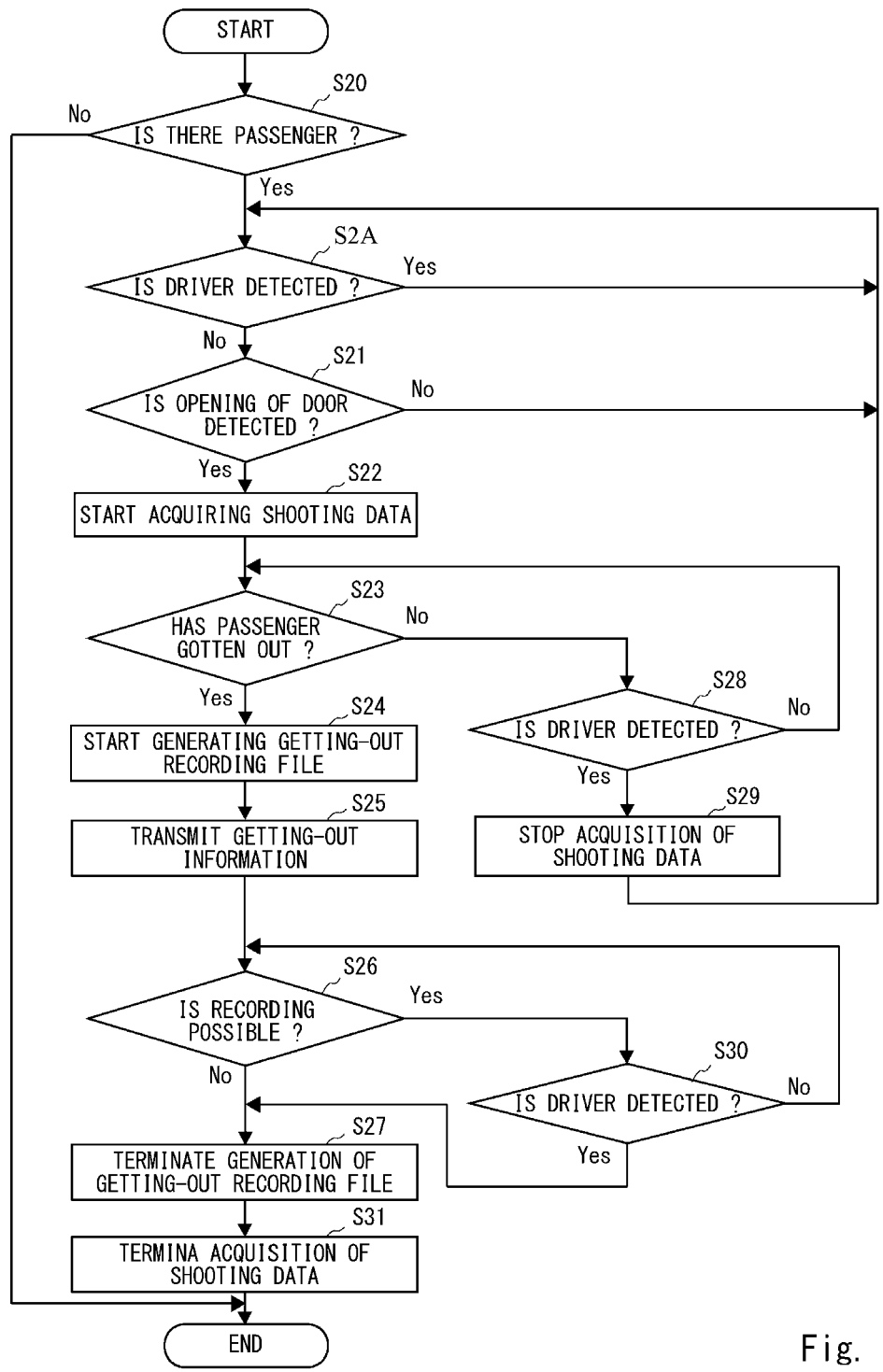
FIG. 4 is a flowchart showing a vehicle-getting-out recording process performed by the recording system.

Next, a process through which the recording system 10 performs vehicle-getting-out recording will be described with reference to FIG. 4. FIG. 4 is a flowchart showing a vehicle-getting-out recording process performed by the recording system 10. FIG. 4 is a flowchart showing processes related to recording of getting-out of the vehicle performed by the recording system 10. The process shown in FIG. 4 starts, for example, on the condition that the vehicle 900 has stopped (i.e., upon stop of the vehicle).

The control unit 100 determines whether or not there is a passenger (Step S20). When it is not determined that there is a passenger (Step S20: No), the control unit 100 terminates the process. On the other hand, when it is determined that there is a passenger (Step S20: Yes), the control unit 100 proceeds to a step S21.

In the step S21, the driver detection unit 130 of the control unit 100 determines whether or not the driver is detected (Step S21). When the driver detection unit 130 determines that the driver is detected (Step S21: Yes), the control unit 100 repeats the step S21. On the other hand, when the driver detection unit 130 does not determine that the driver is detected (Step S21: No), the control unit 100 proceeds to a step S22.

In addition to no longer detecting the driver, a change in the door of the vehicle 900 from a closed door state to an open door state, as shown in step S2A, may be added as an operating condition.

In the step S22, the shooting data acquisition unit 120 of the control unit 100 starts acquiring shooting data (Step S22). The acquired shooting data is supplied to the buffer memory 121, and data that is acquired later than a point in time that is a predetermined period earlier than the present time (i.e., a point in time that is earlier than the present time by a predetermined period) is accumulated in the buffer memory 121, which functions as a ring buffer. In this way, it is possible, when it is detected that the passenger has gotten out of the vehicle, to record the situation of the passenger at a point in time earlier than the detection of his/her getting-out of the vehicle.

Next, the determination unit 131 of the control unit 100 determines whether or not the passenger has gotten out of the vehicle (Step S23). When it is not determined that the passenger has gotten out of the vehicle (Step S23: No), the control unit 100 proceeds to a step S28.

In the step S28, the driver detection unit 130 of the control unit 100 determines whether or not the driver is detected (Step S28). When the driver, who has not been detected until then, has returned to the vehicle 900, the driver detection unit 130 determines that the driver is detected (Step S28: Yes). In this case, the control unit 100 stops the acquisition of the shooting data (Step S29) and returns to the step S21. On the other hand, when the driver detection unit 130 still does not determine that the driver is detected (Step S28: No), the control unit 100 returns to the step S23.

Note that, needless to say, a threshold that the driver detection unit 130 uses to determine that the driver is no longer detected in the step S21 and a threshold that the driver detection unit 130 uses to determine that the driver is detected again in the step S28 do not need to be the same as each other. That is, in the case where the driver detection unit 130 detects the size of the driver's head, the size of the driver's head on the image when the driver is detected again in the step S28 is preferably larger than the size of the driver's head on the image when the driver is no longer detected in the step S21. Alternatively, the driver detection unit 130 is preferably configured so that the range that used when the driver is no longer detected (e.g., a range in which the distance between the driver and the vehicle 900 is 20 meters at maximum) is larger than the range that is used when the driver is detected again (e.g., a range in which the distance between the driver and the vehicle 900 is 15 meters at maximum). By setting a certain hysteresis (i.e., a certain difference) as described above, the recording system 10 can perform the above-described process smoothly.

The process returns to the step S23. In the step S23, when the determination unit 131 determines that the passenger has gotten out of the vehicle (Step S23: Yes), the determination unit 131 supplies a signal indicating that the detection of the getting-out of the passenger to the recording control unit 123, and the control unit 100 proceeds to a step S24.

In the step S24, the control unit 100 starts generating a vehicle-getting-out recording file (Step S24). Specifically, the recording control unit 123, which has received the signal indicating that the detection of the getting-out of the passenger, instructs the shooting data processing unit 122 to generate a vehicle-getting-out recording file.

Next, in a step S25, the control unit 100 transmits vehicle-getting-out information to a portable terminal carried by the driver through the communication control unit 132 and the communication unit 170 (Step S25).

Next, in a step S26, the control unit 100 determines whether or not the vehicle-getting-out recording file, which is being generated, can be recorded in the recording device 160 (Step S26). When the size of the vehicle-getting-out recording file, which is being generated, is smaller than or equal to the available capacity of the recordable area of the recording device 160, the control unit 100 determines that the vehicle-getting-out recording file can be recorded therein (Step S26: Yes). In that case, the recording control unit 123 proceeds to a step S30.

In the step S30, the driver detection unit 130 of the control unit 100 determines whether the driver is detected (Step S30). When the driver detection unit 130 does not determine that the driver is detected (Step S30: No), the control unit 100 returns to the step S26. On the other hand, when the driver, who has not been detected until then, has returned to the vehicle 900, the driver detection unit 130 determines that the driver is detected (Step S30: Yes). In this case, the control unit 100 proceeds to a step S27.

The process returns to the step S26. In the step S26, when there is a possibility that the size of the vehicle-getting-out recording file, which is being generated, is larger than the available capacity of the recordable area of the recording device 160, the control unit 100 does not determine that the vehicle-getting-out recording file can be recorded therein (Step S26: No). In that case, the recording control unit 123 terminates the generation of the vehicle-getting-out recording file (Step S27). Further, when the shooting data acquisition unit 120 terminates the acquisition of the shooting data (Step S31), the control unit 100 terminates the series of processes.

Through the above-described series of processes, when the passenger gets out of the vehicle while the driver is away from the vehicle 900, the recording system 10 shoots (i.e., photographs or films) the situation of the passenger and swiftly transmits vehicle-getting-out information to the driver (i.e., the driver's portable terminal).

Note that although the acquisition of shooting data is started in the step S22 and the acquisition of the shooting data is stopped in the step S29 in the above-described series of processes, the shooting data may be continuously acquired at all times.

Figure 5:
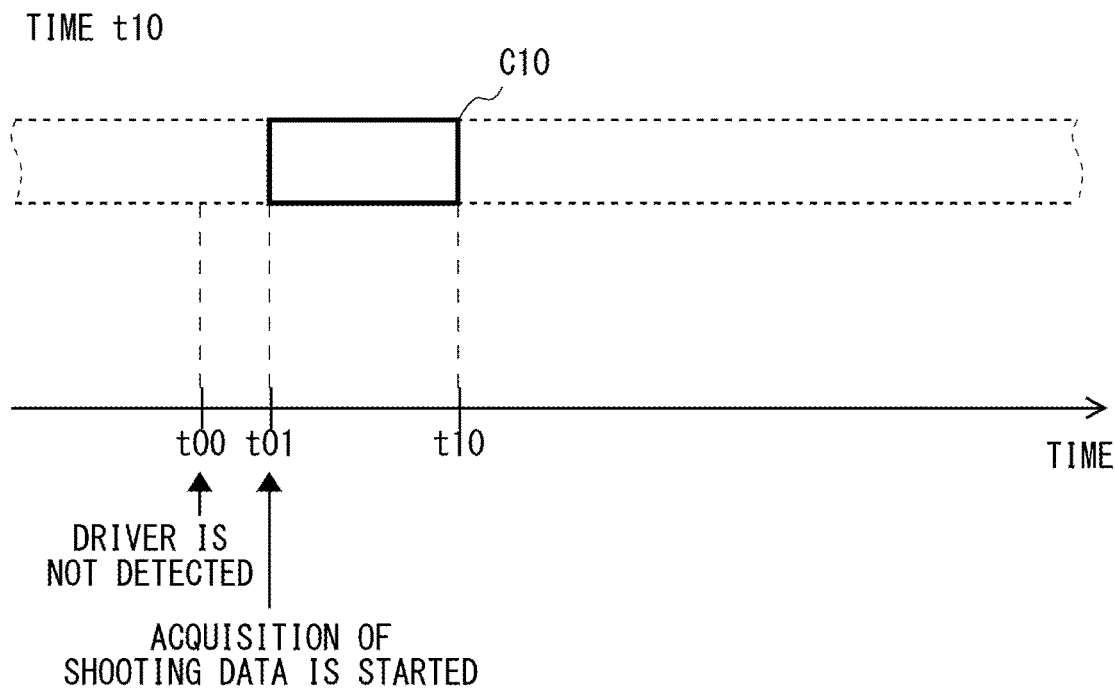
FIG. 5 is a first diagram showing an example of shooting data generated by the recording system.

Next, shooting data generated by the recording system 10 will be described with reference to FIGS. 5 to 8. FIG. 5 is a first diagram showing an example of shooting data generated by the recording system 10. FIG. 5 shows a relation between shooting data and certain times. In FIG. 5, the horizontal axis represents time, indicating that the time elapses in a direction indicated by an arrow (to the right) from a time t00 to a time t10. Each of FIGS. 6 to 8 also shows a relation between shooting data and certain times in a manner similar to that in FIG. 5.

FIG. 5 shows a state of the shooting data at the time t10. In FIG. 5, the time t00, which is earlier than the time t10, is a time at which the recording system 10 no longer detects the driver, and corresponds to the step S22 in the process shown in FIG. 4. A time t01, which is later than the time t00, is a time at which the recording system 10 starts acquiring shooting data, and corresponds to the step S22 in the process shown in FIG. 4. The long rectangular shape shown along the time axis represents shooting data C10 at the time t10, which is later than the time t01. The shooting data C10 is shooting data generated by the camera 150 and stored in the buffer memory 121. The shooting data C10 is shooting data in a period from the time t01 to the time t10.

Figure 6:
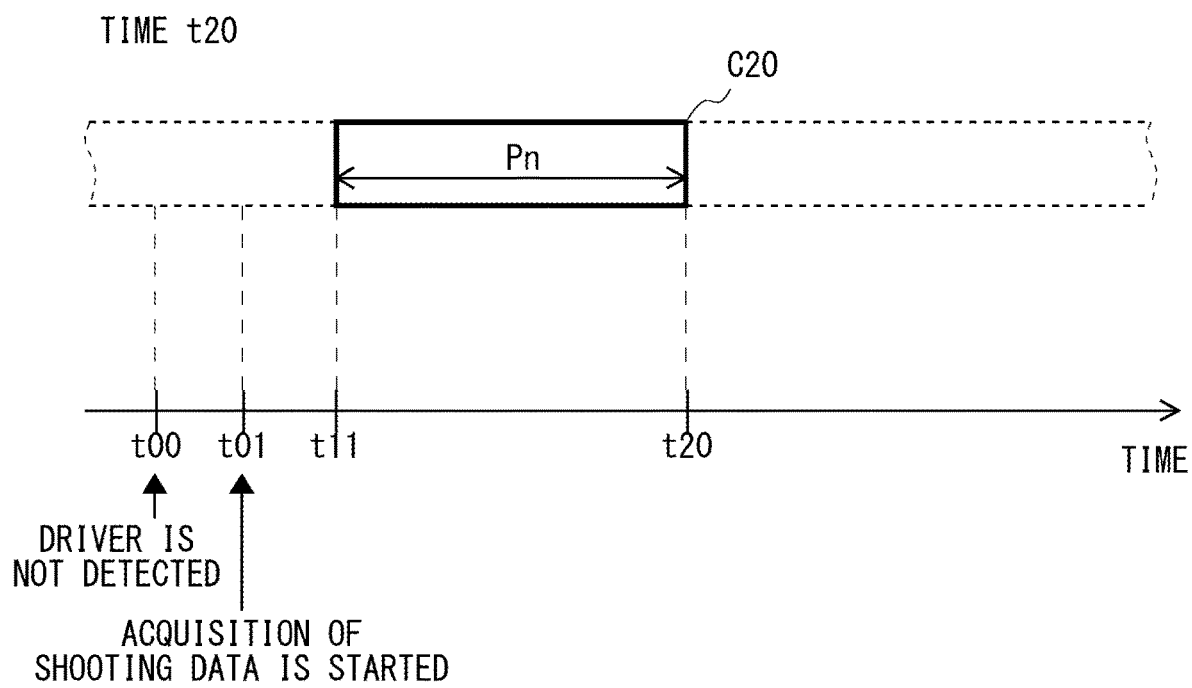
FIG. 6 is a second diagram showing an example of shooting data generated by the recording system.

Next, FIG. 6 will be described. FIG. 6 is a second diagram showing an example of shooting data generated by the recording system 10. FIG. 6 shows a state of the shooting data at a time t20, which is later than the time t10. The long rectangular shape shown along the time axis represents shooting data C20 at the time t20. The recording system 10 is configured so as to continuously store shooting data for a predetermined period Pn. The period Pn is, for example, a period of 60 seconds, 120 seconds, or 150 seconds. Regarding the shooting data C20 at the time t20, the time t11, which is earlier than the time t20 by the period Pn, is later than the time t01 at which the acquisition of the shooting data is started. Therefore, the shooting data C20 at the time t20 is shooting data in the period Pn from the time t11 to the time t20.

Note that as the time elapses, shooting data that was obtained before the start of the period Pn, stored in the buffer memory 121, is successively erased. Therefore, the shooting data from the time t01 to the time t11 has already been erased.

Figure 7:
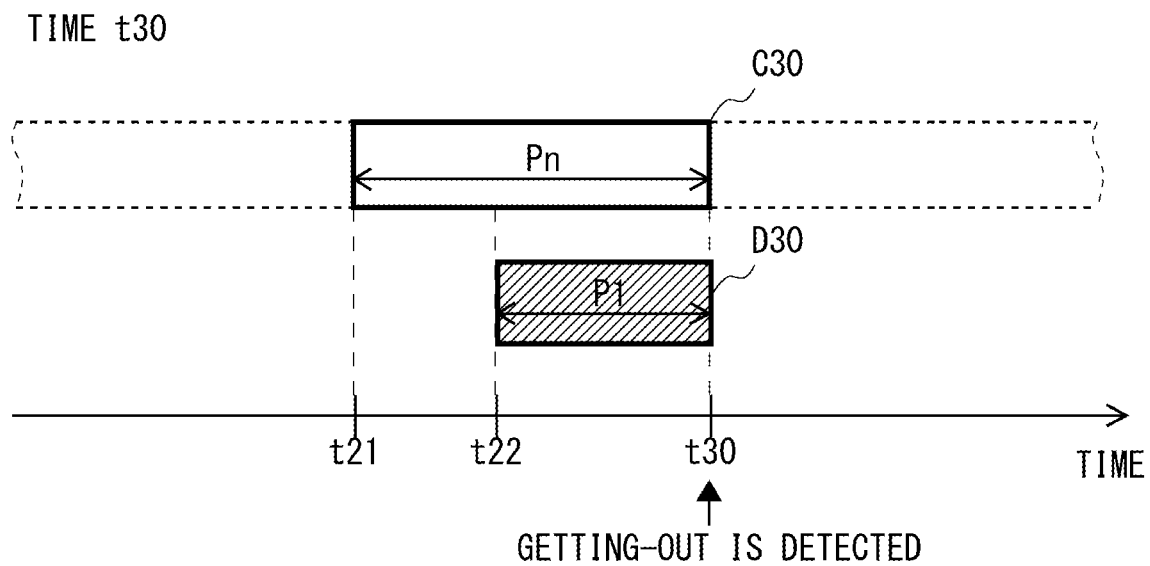
FIG. 7 is a first diagram showing an example of a shooting file generated by the recording system.

Next, FIG. 7 will be described. FIG. 7 is a first diagram showing an example of a shooting file generated by the recording system 10. FIG. 7 shows a state of shooting data at a time t30, which is later than the time t20. The time t30 is a time at which the determination unit 131 determines that the passenger has gotten out of the vehicle, and corresponds to the step S23 in the process shown in FIG. 4.

Shooting data C30 stored in the buffer memory 121 at the time t30 is shooting data for a period from a time t21, which is earlier than the time t30 by the period Pn, to the time t30.

A rectangle with hatching shown below the shooting data C30 is shooting data D30 included in the shooting file. The shooting data D30 is generated from shooting data at and after a time t22, which is earlier than the time t30 by the period P1, by using the detection of the getting-out of the vehicle at the time t30 as a trigger. Note that the period P1 may be zero.

Figure 8:
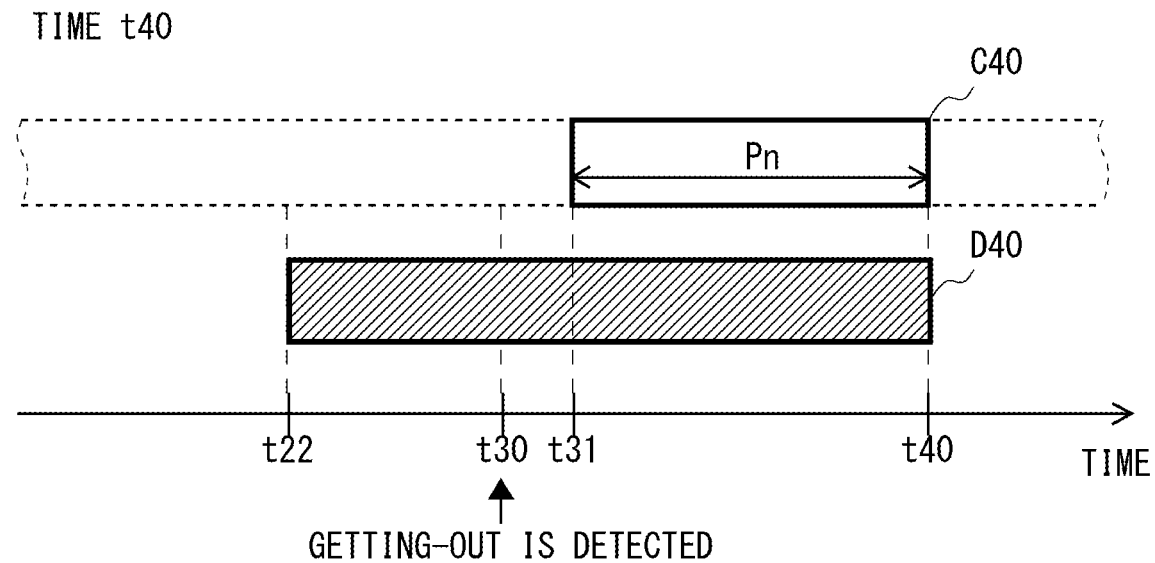
FIG. 8 is a second diagram showing an example of a shooting file generated by the recording system.

Next, FIG. 8 will be described. FIG. 8 is a second diagram showing an example of a shooting file generated by the recording system 10. FIG. 8 shows a state of shooting data at a time t40, which is later than the time t30. The time t40 is a time at which the control unit 100 terminates the generation of the vehicle-getting-out recording file, and corresponds to the step S27 in the process shown in FIG. 4.

Shooting data C40 stored in the buffer memory 121 at the time t40 is shooting data for a period from a time t31, which is earlier than the time t40 by the period Pn, to the time t40.

A rectangle with hatching shown below the shooting data C40 is shooting data D40 included in the shooting file. The shooting data D40 is continuously generated from the time t22 shown in FIG. 7. At the time t40, the control unit 100 terminates the generation of the shooting file. As a result, the control unit 100 generates a shooting file containing shooting data from the time t22 to the time t40. Note that the vehicle-getting-out recording file generated as described above may be one collective file, or may be generated as a plurality of divided files each having a predetermined size.

The first embodiment has been described above, but the configuration of the recording system 10 according to the first embodiment is not limited to the above-described configuration. For example, the recording device 160 may not be disposed in the vehicle 900, and instead may be disposed at a place away from the vehicle 900 and connected thereto through the communication unit 170. In such a case, the recording control unit 123 transmits shooting data through the communication control unit 132 and the communication unit 170.

Further, in the flowchart shown in FIG. 4, the acquisition of shooting data in the step S22 may be started by using the fact that the door of the vehicle 900 changes from a closed door state to an opened door state in addition to the fact that the driver is no longer detected as a trigger. In such a case, the recording system 10 may detect the opened door state based on the shooting data or based on information about the opening/closing of the door acquired from the ECU of the vehicle 900. Further, when the acquisition of shooting data is started by using the detection of the opened door state as a trigger, the start time of the vehicle-getting-out recording file may be the time at which the opened door state is detected.

That is, in the recording system 10, the determination unit 131 may detect that the door of the vehicle 900 has changed from the closed door state to the opened door state, and may also determine that the passenger has gotten out of the vehicle from the door which is in the opened door state. Further, the recording control unit 123 may instruct to generate the vehicle-getting-out recording file from the time at which the opened door state is detected.

The step S30 in the flowchart shown in FIG. 4 is not indispensable and may not be performed. In that case, the vehicle-getting-out recording file may be configured so as to record (i.e., include) the predetermined period, and/or may be configured so as to record (i.e., include) a period for which the vehicle-getting-out recording file can be recorded with the recordable capacity of the recording device 160. Further, the process corresponding to the step S27 may be performed by an operation performed by the driver.

The recording system 10 does not need to be configured (i.e., constructed) as a single product, and instead may be implemented by a combination of a plurality of products. For example, the recording system 10 may be formed by cooperation of a dashboard camera and a navigation system (i.e., a GPS system). Further, the recording system 10 may be implemented by cooperation with a component(s)/structure(s) included in the vehicle 900.

As described above, according to the first embodiment, it is possible to provide a recording system or the like capable of appropriately finding out the movements of a passenger who has gotten out of a stopped vehicle.

Second Embodiment

Next, a second embodiment will be described. A recording system according to the second embodiment differs from the recording system 10 according to the first embodiment because the recording system according to the second embodiment includes a plurality of cameras.

Figure 9:
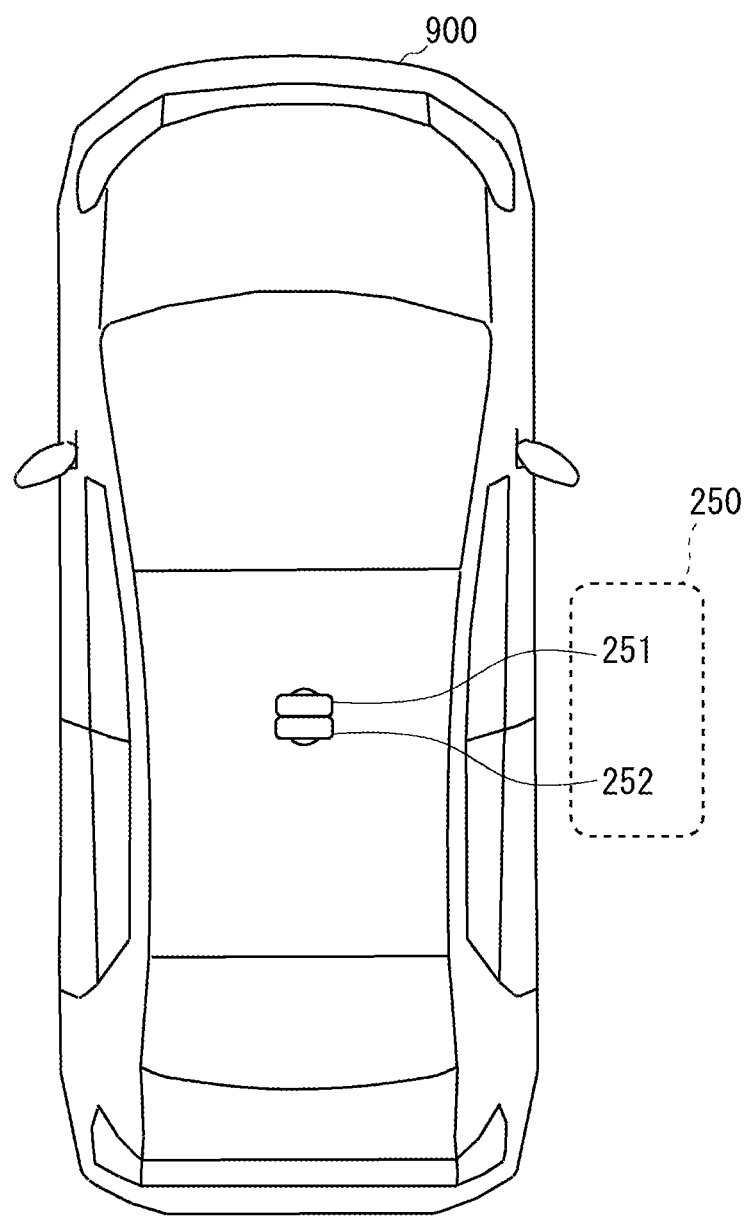
FIG. 9 is a top view of a vehicle provided with a recording system according to a second embodiment.
Figure 10:
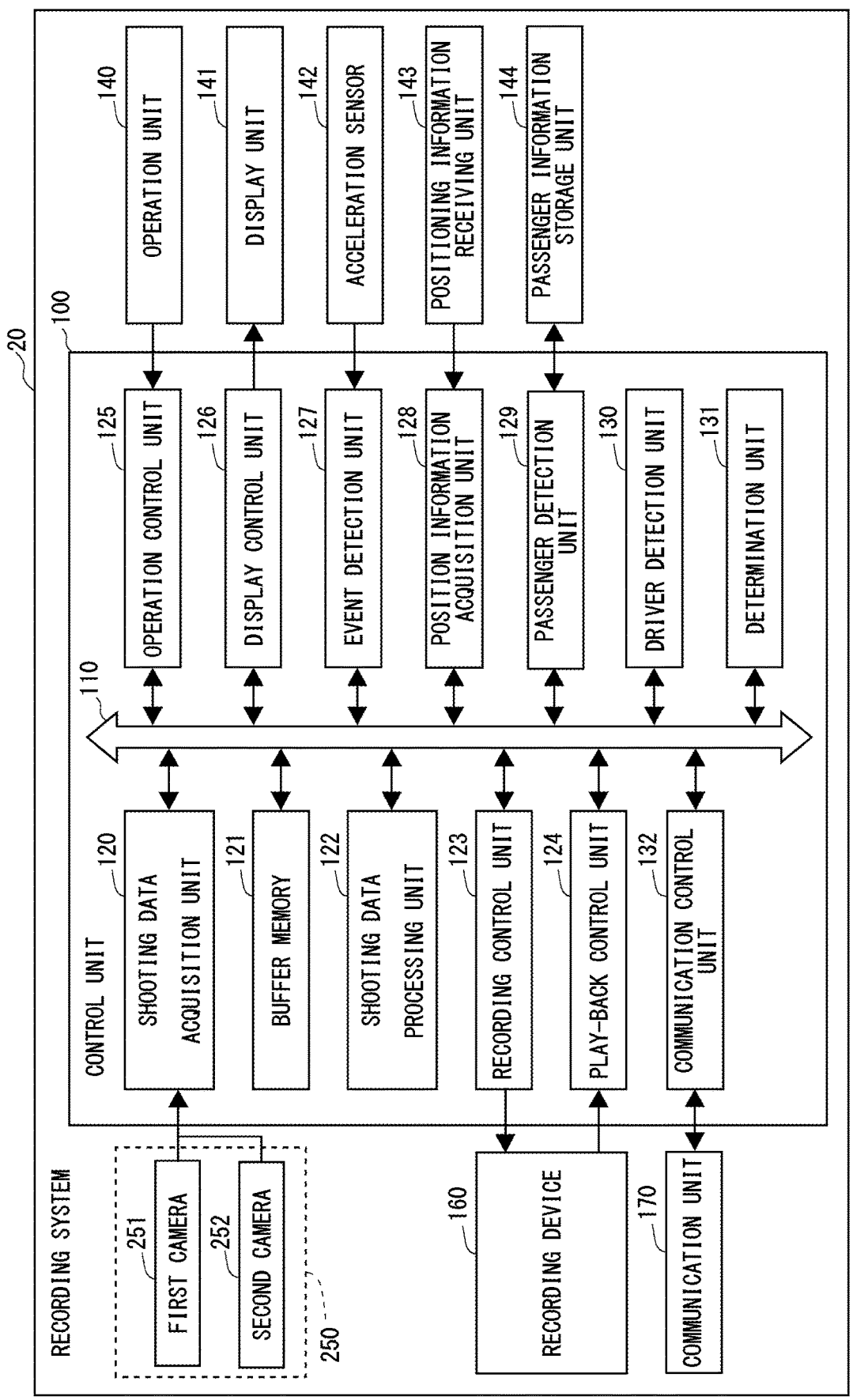
FIG. 10 is a block diagram of a recording system according to the second embodiment.

A configuration of the recording system according to the second embodiment will be described with reference to FIGS. 9 and 10. FIG. 9 is a top view of a vehicle provided with a recording system 20 according to the second embodiment. FIG. 10 is a block diagram of the recording system 20 according to the second embodiment.

The recording system 20 according to the second embodiment includes a camera 250 in place of the omnidirectional camera. The camera 250 is composed of two cameras (a first camera 251 and a second camera 252). That is, the first camera 251 shoots (i.e., photographs or films) a view in front of the vehicle 900 and the second camera 252 shoots a view behind the vehicle 900. Each of the first and second cameras 251 and 252 is connected to the shooting data acquisition unit 120 and supplies generated shooting data to the shooting data acquisition unit 120.

The buffer memory 121 accumulates the shooting data acquired from each of the first and second cameras 251 and 252, and supplies each of the accumulated shooting data to the shooting data processing unit 122.

The shooting data processing unit 122 performs processing for each of the shooting data acquired from the first and second cameras 251 and 252. Further, the shooting data processing unit 122 in the recording system 20 may combine shooting data acquired from the first camera 251 and that acquired from the second camera 252, and thereby process images taken by the first and second cameras 251 and 252 so that these images can be viewed at once on a certain display.

The recording control unit 123 determines, based on a signal received from the determination unit 131, which of the two shooting data acquired from the respective cameras the passenger who has gotten out of the vehicle is included. Then, the recording control unit 123 selects which of the two shooting data acquired from the first and second cameras 251 and 252, respectively, should be used when the recording control unit 123 instructs the shooting data processing unit 122 to generate the vehicle-getting-out recording file.

The passenger detection unit 129 detects the passenger by performing processes similar to those described in the first embodiment for each of the two shooting data acquired from the first and second cameras 251 and 252, respectively.

When detecting the getting-out of the passenger, the determination unit 131 detects which of the two shooting data acquired from the first and second cameras 251 and 252, respectively, the passenger, who has gotten out of the vehicle, is included. The determination unit 131 includes (i.e., incorporates), in the signal that indicates that the getting-out of the passenger was detected after the door was opened/closed, information as to which of the two images taken by the two cameras the passenger, who has gotten out of the vehicle, is included, and supplies this signal to the recording control unit 123.

Figure 11:
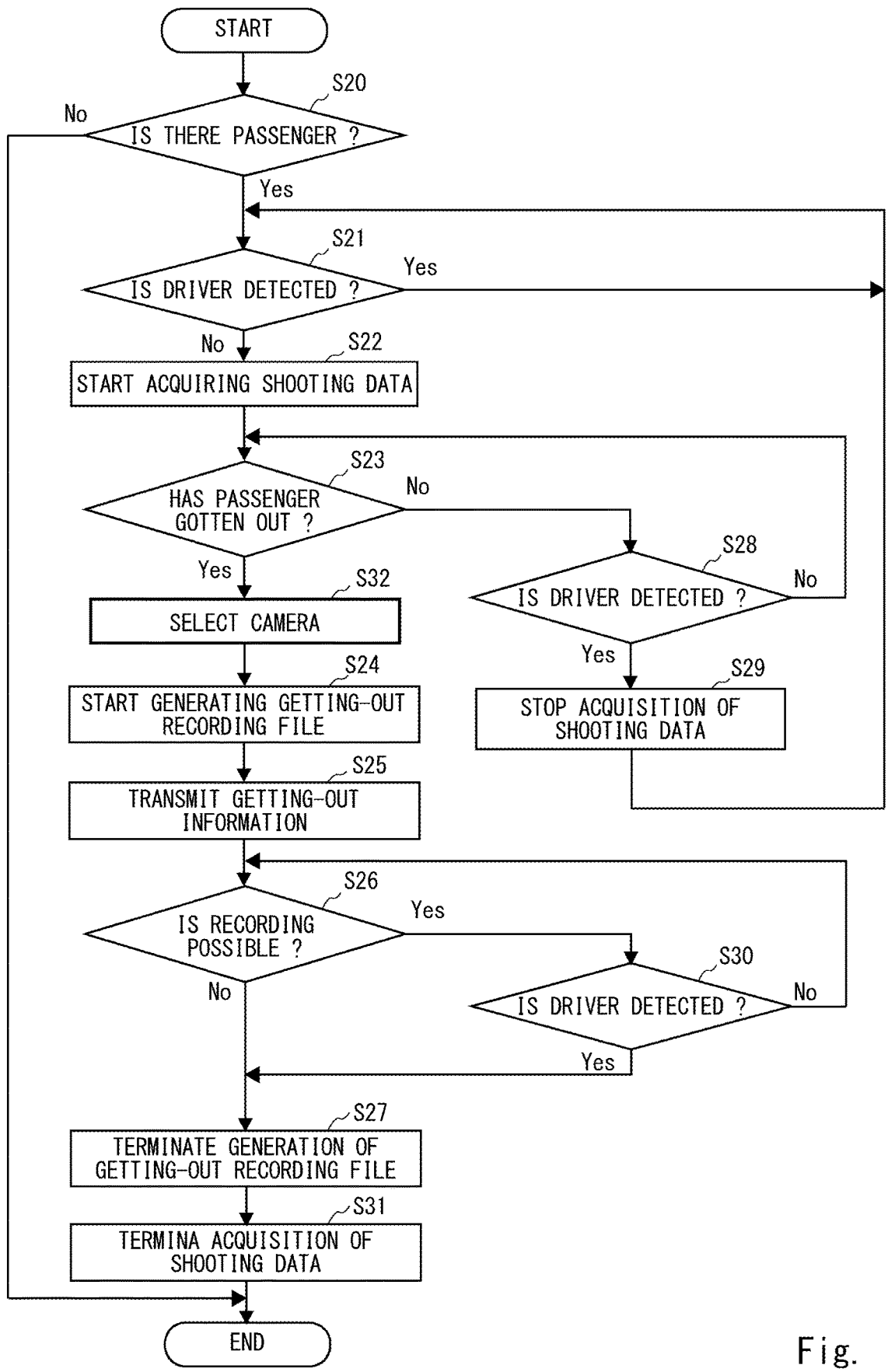
FIG. 11 is a flowchart showing a vehicle-getting-out recording process according to the second embodiment.

Next, processes performed by the recording system 20 will be described with reference to FIG. 11. FIG. 11 is a flowchart showing a vehicle-getting-out recording process according to the second embodiment. The vehicle-getting-out recording process according to the second embodiment differs from that according to the first embodiment because a process for selecting one of the first and second cameras 251 and 252 is performed in the vehicle-getting-out recording process according to the second embodiment. Features that differ from those in the process according to the first embodiment will be described hereinafter, while omitting descriptions of processes similar to those in the first embodiment as appropriate. Processes from a step S20 to a step S22 are similar to those in the first embodiment.

In a step S23, the determination unit 131 of the control unit 100 determines whether or not the passenger has gotten out of the vehicle (Step S23). When it is not determined that the passenger has gotten out of the vehicle (Step S23: No), the control unit 100 proceeds to a step S28. On the other hand, when the determination unit 131 determines that the passenger has gotten out of the vehicle (Step S23: Yes), the determination unit 131 supplies a signal indicating that the detection of the getting-out of the passenger to the recording control unit 123, and the control unit 100 proceeds to a step S32.

In a step S32, the recording control unit 123 of the control unit 100 selects which of the two images taken by the first and second cameras 251 and 252 should be recorded (Step S32).

Next, the recording control unit 123 instructs the shooting data processing unit 122 to start generating a vehicle-getting-out recording file by using the image taken by the selected camera (i.e., by using the selected image) (Step S24). Processes in a step S25 and the subsequent steps are similar to those in the first embodiment.

The second embodiment has been described above, and the above-described recording system 20 may include, for example, three or more cameras. The cameras may be those included in the vehicle 900. In such a case, the recording system 20 may acquire shooting data through a communication bus of the vehicle 900 such as a CAN (Controller Area Network).

By the above-described configuration, the recording system 20 according to the second embodiment shoots (i.e., photographs or films) the passenger who has gotten out of the vehicle by a camera that is appropriately selected from a plurality of cameras. In this way, the recording system 20 can efficiently generate shooting data to be recorded. That is, according to the second embodiment, it is possible to provide a recording system or the like capable of appropriately and efficiently finding out the movements of a passenger who has gotten out of a stopped vehicle.

Note that the above-described program can be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to the computer by using various types of transitory computer readable media. Examples of the transitory computer readable media include an electrical signal, an optical signal, and an electromagnetic wave. The transitory computer readable media can be used to supply programs to the computer through a wire communication path such as an electrical wire and an optical fiber, or wireless communication path.

Note that the present invention is not limited to the above-described example embodiments and can be modified as appropriate without departing from the spirit and scope of the invention.

What is claimed is:
1. A recording system comprising:
a processor coupled to a memory storing instructions, the processor configured to:
acquire shooting data from a camera configured to take an image of an inside and an outside of a vehicle;
detect a passenger;
detect a driver present in a predetermined range;
determine whether or not the passenger present inside the vehicle has gotten out of the vehicle; and
instruct, after the driver that had been detected is no longer detected, and when the processor has determined that the passenger has gotten out of the vehicle, a recording device to record the shooting data of the outside of the vehicle,
wherein the processor is configured to instruct the recording by the recording device to be stopped in response to the detection of the driver again.

* * * * *